United States Patent [19]
Volpe

[11] Patent Number: 5,362,435
[45] Date of Patent: Nov. 8, 1994

[54] PROCESS OF MOLDING MULTI-DUROMETER SOLES

[75] Inventor: John F. Volpe, Sturbridge, Mass.

[73] Assignee: Quabaug Corporation, North Brookfield, Mass.

[21] Appl. No.: 103,085

[22] Filed: Aug. 6, 1993

[51] Int. Cl.⁵ .................. B29B 11/10; B29C 35/02; B29C 43/18

[52] U.S. Cl. .................. 264/248; 12/146 B; 12/146 BR; 36/30 R; 36/32 R; 264/148; 264/158; 264/177.1; 264/250; 264/266; 264/321; 264/325

[58] Field of Search .............. 264/248, 250, 255, 266, 264/320, 321, 325, 177.1, 210.1, 171, 148, 158; 36/30 R, 32 R; 12/146 BR, 146 B

[56] References Cited

U.S. PATENT DOCUMENTS

| | | |
|---|---|---|
| 3,042,948 | 7/1962 | Di Nunzio . |
| 4,247,513 | 1/1981 | Liu ...................................... 264/248 |
| 4,364,188 | 12/1982 | Turner et al. . |
| 4,364,189 | 12/1982 | Bates . |
| 4,730,402 | 3/1988 | Norton et al. . |
| 4,798,010 | 1/1989 | Sugiyama . |
| 4,876,053 | 10/1989 | Norton et al. . |
| 4,894,933 | 1/1990 | Tonkel et al. . |
| 5,077,915 | 1/1992 | Gross . |

*Primary Examiner*—Mathieu Vargot
*Attorney, Agent, or Firm*—Samuels, Gauthier & Stevens

[57] ABSTRACT

A process of molding multi-durometer footwear soles which includes forming elongated components from compression moldable compounds, each component having a different hardness (Shore A). The components are configured and dimensioned such that the softer component will be positioned on top of and within the configuration of the bottom, harder component. The assembled components are placed in a compression mold and covulcanized together.

11 Claims, 1 Drawing Sheet

PROCESS OF MOLDING MULTI-DUROMETER SOLES

BACKGROUND OF THE INVENTION

1. Field of the Invention

This invention relates to the molding of footwear soles, and is concerned in particular with the molding of soles from multiple components having different hardnesses.

2. Background of the Invention

It is known to provide shoe soles comprising combinations of two or more components having different hardnesses. The compounds are strategically configured and arranged to achieve optimum characteristics including comfort and support for the wearer's foot.

U.S. Pat. No. 4,798,010 (Sugiyama) describes a midshoe sole for sport shoes which comprises both hard and soft elastic elements. The elements are produced separately with complimentary configurations enabling them to be assembled and bonded together with an adhesive.

U.S. Pat. No. 3,042,948 (Di Nunzio) and U.S. Pat. No. 5,077,915 (Gross) both teach shoe soles having two components with different durometers. In each of these references a cavity is cut in one component, and the other component is shaped to fit into the cavity. In Gross, the two components are secured together with an adhesive, whereas in Di Nunzio the two components can be joined by vulcanization.

A major drawback associated with these prior art methods is their labor intensive nature, each requiring a careful shaping and matching of interlocked components, the sizes of which must be adjusted to produce differently sized soles. Each sole size must be separately molded and then have a cavity cut therein. The dimensions of the cavity are different for each shoe size and thus the dimensions of the shaped interlocking component are also different for each sole size. During molding, care must be exercised to insure that mating components are properly matched. Otherwise, the resulting composites will be flawed by voids and/or distortions.

SUMMARY OF THE INVENTION

A primary objective of the present invention is the provision of an improved process for molding multi-durometer soles, which process is substantially less labor intensive than those conventionally practiced by those skilled in the art.

A further objective of the present invention is the provision of a process for molding multi-durometer soles from extruded stock that has simply been cut to length to suit different size requirements.

These and other objectives and advantages of the present invention will become more apparent as the description proceeds with reference to the accompanying drawings.

DETAILED DESCRIPTION OF THE ILLUSTRATED EMBODIMENTS

Figure 1:
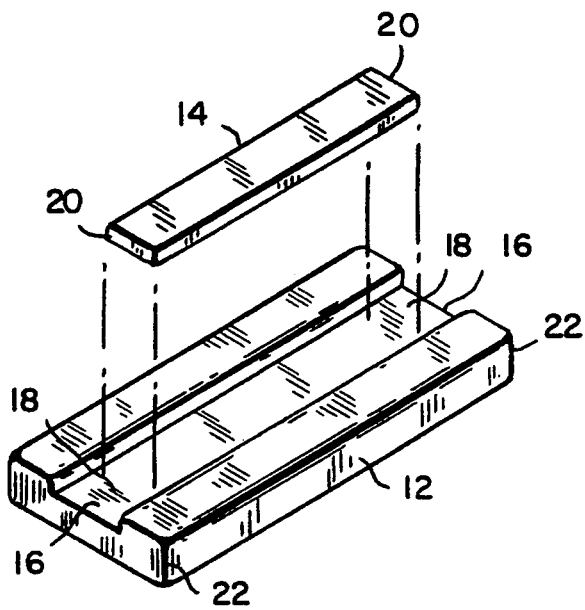
FIG. 1 is an exploded perspective view of two components of a shoe sole in accordance with the present invention.
Figure 2:
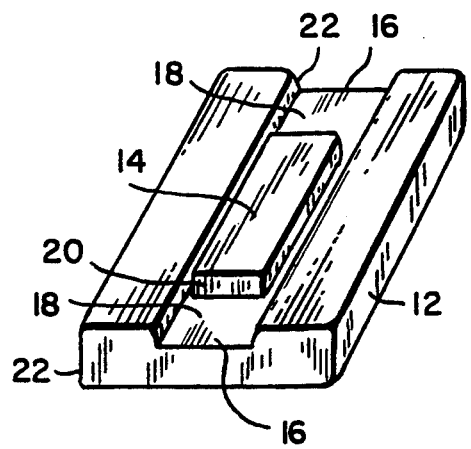
FIG. 2 is a perspective view of the same two components following assembly and prior to molding into the final desired shape.
Figure 3:
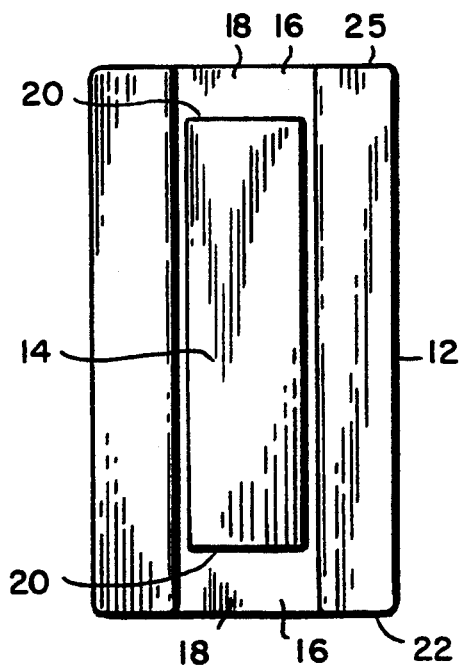
FIG. 3 is a top plan view of the components shown in FIG. 2.

FIGS. 1-3 illustrate two elongated components 12, 14, each comprising segments cut from extruded stock. The components are cut to specific lengths in order to provide weights suitable to the particular size of sole being molded. Larger or smaller soles can be accommodated by simply adjusting the lengths of the cut segments. Thus, an inventory of standard extruded stock can satisfy a wide range of sole sizes.

In the specific example illustrated in the figures, the first, bottom component 12 has a U-shaped cross section and the second, top component 14 has a rectangular cross section. Although these shapes preferred, they may be altered without departing from the intended scope of the invention as defined by the appended claims.

In the figures, the top component 14 is shorter than the bottom component 12 so that when the top component 14 is placed in the channel 16 of the bottom component 12, the end portions 18 of the channel remain open and available to accommodate expansion of the two components during molding. Preferably, the top component 14 is centered with respect to the bottom component 12 such that the ends 20 of the top component 14 are equidistant from the ends 22 of the bottom component 12.

Figure 4:
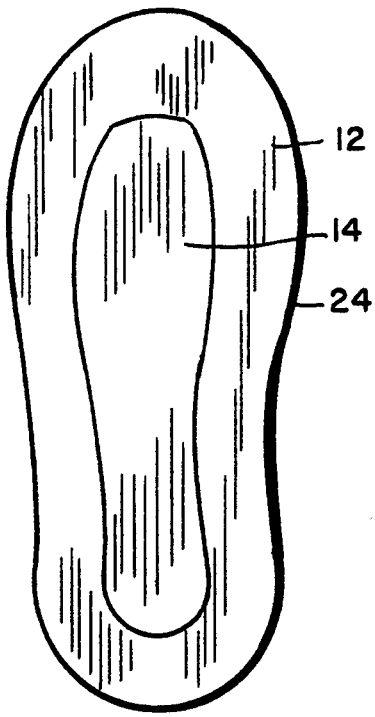
FIG. 4 is a top plan view of a shoe sole molded from the components shown in FIGS. 1-3.

The top and bottom components 12, 14 are assembled as illustrated in a compression mold (not shown) and are molded and cured under heat and pressure according to conventional molding techniques. The end result is a sole in which the two components are covulcanized together. FIG. 4 illustrates a molded sole 24 having the second component 14 centrally located within the sole. By molding the two extruded components of the present invention together to form a sole, many of the conventional processing steps can be eliminated, including: molding two separate components, cutting a cavity in the main sole portion wherein the size of the cavity is different for each sole size, forming and shaping an insert, matching the correctly sized insert to the cavity and then joining the two components together.

To produce a sole which provides comfort and support for the wearer's foot, two different materials were used, each having a different durometer. The hardness of the materials is measured in accordance with ASTM D2240 (Shore A). The durometer of the bottom component 12 is greater than the durometer of the top component 14. The difference between the two durometers should range from about 10 to 25 points, and preferably should be about 15 points.

The two components are molded from microcellular compounds and more specifically may be molded from ethylene-vinyl acetate ("EVA"), chlorinated polyethylene ("CPE"), syndiotactic 1,2-polybutadiene, polybutadiene, microcellular rubber compounds such as styrene-butadiene rubber, isoprene, or polymeric blends thereof. When these components are subjected to heat and pressure in a compression mold, the compounds expand volumetrically. The expansion factors of the two components preferably are as close to one another as possible, meaning that the compounds are "compatible" and thus capable of being covulcanized with predictable results and without resulting voids or deleterious distortions.

Conventional curing agents, fillers, plasticizers, coloring agents and other similar compounds may be blended with the microcellular compounds.

While the invention has been described in connection with the molding of the two extruded components having different durometers, it will be understood by those skilled in the art that additional components may be included in combinations and configurations selected to accommodate differing sole designs.

The foregoing description has been set forth to illustrate the invention and is not intending to be limiting. Since modifications of the described embodiments incorporating the spirit and substance of the invention may occur to persons skilled in the art, the scope of the invention should be limited solely with reference to the appended claims and equivalents.

What is now claimed is:

1. A process for molding an outer sole for an article of footwear, said process comprising:

extruding first and second elongated components respectively from first and second compression moldable compounds, said first compound having a hardness (Shore A) greater than that of said second compound, said first component having a channel extending longitudinally therethrough;

assembling said second component within the channel of said first component, said second component being configured and dimensioned to cooperate with said first component in defining at least one vacant expansion zone within said channel; and covulcanizing the thus assembled components in a compression mold under conditions of elevated pressure and temperature with an accompanying expansion of said components filling said mold and said at least one expansion zone thereby to produce a sole.

2. The process of claim 1, wherein said compression moldable compounds are microcellular.

3. The process of claim 2, wherein the microcellular compounds are selected from the groups consisting of EVA, CPE, polybutadiene, styrene-butadiene rubber, isoprene, and polymeric blends thereof.

4. The process of claim 1, wherein the difference in the hardnesses of said first and second components is between 10 and 25 points.

5. The process of claim 4, wherein the minimum difference in the hardnesses of the two compounds is approximately 15 points.

6. The process of claim 1, wherein the ends of said second component are spaced inwardly from the ends of said first component to form said expansion zone, thereby allowing the end portions of said channel to remain vacant.

7. The process of claim 6, wherein the ends of said second component are equidistant from the ends of said first component.

8. The process of claim 6, wherein the vacant end portions of said channel are filled by said first component.

9. The process of claim 1, wherein the expansion factors of the two components are approximately the same.

10. The process of claim 1, wherein a third elongated component is placed in said channel before the components are covulcanized.

11. The process of claim 1, wherein there are two vacant expansion zones.

* * * * *